Patented Oct. 9, 1951

2,570,611

UNITED STATES PATENT OFFICE 2,570,611

PROCESS FOR BREAKING PETROLEUM EMULSIONS

Robert W. Towne, Baden Station, Mo., assignor to Monsanto Chemical Company, St. Louis, Mo., a corporation of Delaware No Drawing. Application July 20, 1949, Serial No. 105,885

4 Claims. (Cl. 252—331)

This invention relates to the treatment of emulsions of mineral oil and water for the purpose of separating the oil from the water; more specifically, this invention relates to the treatment of water-in-oil type petroleum emulsions with a minor amount of a compound selected from the group consisting of trichloro-acetic acid and its salts, thereby breaking the emulsion and permitting the separation of the oil from the water.

Petroleum emulsions are of the water-in-oil type. In such emulsions fine droplets of naturally occurring waters or brines are dispersed in a substantially permanent state throughout the oil. In such emulsions the oil constitutes the continuous phase of the emulsion. These water-in-oil petroleum emulsions are most commonly found or obtained from producing wells or from the bottoms of oil storage tanks. The presence of emulsions in petroleum oils is undesirable as wet oils can be refined or distilled only with considerable difficulty since the presence of the oil in the water during distillation causes foaming, which contaminates the distillate.

It is an object, therefore, of this invention to provide a novel, inexpensive and efficient process for the separation of emulsions of the kind previously described into their component parts of oil and water or brine, thereby permitting the refining of the separated oil without the inherent difficulties that would be encountered if refining would be attempted in the presence of an emulsion.

Other objects will become apparent from the description of the novel process of this invention and the claims.

Briefly stated, these objects are accomplished by my process which comprises subjecting a petroleum emulsion of the water-in-oil type to the action of a minor amount of a compound selected from the group consisting of trichloroacetic acid and its salts, which thereby causes the emulsion to break down and separate into its component parts of oil and water or brine when the emulsion is permitted to stand in a quiescent state after such treatment.

In the novel process of this invention, the term "salts" is broad enough to include the alkali metal and the alkaline earth salts, such as sodium, potassium, lithium, ammonium, magnesium, calcium, the salts of other metals, such as copper and iron, and the substituted organic amonium salts, such as the salts of methylamine, trimethylamine, diethylamine, monoethanolamine, triethanolamine and isopropanolamine.

The treatment of petroleum emulsions of the water-in-oil type with chemical demulsifying agents is well known to those skilled in the art. In carrying out the novel process of this invention, the trichloroacetic acid or its salt is brought into contact with the petroleum emulsion by any of the numerous methods utilized in the treatment of petroleum emulsions with chemical demulsifying agents. For example, trichloroacetic acid or its salts may be introduced into the well in which the emulsion is produced. Trichloroacetic acid or its salts may be introduced into a conduit or pipeline through which the petroleum emulsion is flowing. Trichloroacetic acid or its salt may further be introduced into a container which holds the settlings from an oil storage tank and contains a petroleum emulsion of the water-in-oil type. In some instances, it may be feasible to introduce the treating agent into the stream of the petroleum emulsion emerging from the surrounding strata before the water-in-oil emulsion enters the barrel of the well pump or the tubing up through which said water and oil flow to the surface of the ground, thereby permitting efficient mixing and contacting of the demulsifying agent to the petroleum emulsion through the naturally occurring turbulence in the stream. After the trichloroacetic acid or its salt has been brought in contact with the petroleum emulsion of the water-in-oil type, the mixture may be agitated in order that complete dispersion of the demulsifying agent throughout the petroleum emulsion is obtained. This agitation may be accomplished by natural means or by the use of mechanical devices. The time of agitation varies considerably between different types of petroleum emulsions, and is governed chiefly by the time required to obtain a complete dispersion of the treating agent throughout the emulsion. After treatment, the emulsion is allowed to stand in a quiescent state, usually in a settling tank, and usually at a temperature which may be varied from atmospheric temperature to about 200° F. so as to permit the water or brine to separate from the oil. The temperature in any case is preferably maintained lower than the boiling point of the more volatile valuable constituents.

The amount of treating agent or demulsifying agent that may be used in breaking the emulsion may be varied considerably. For example, the concentration of trichloroacetic acid or its salts may vary from approximately 1 part or more of the treating agent to 500 parts of the emulsion down to 1 part or less of the treating agent to about 30,000 parts of emulsion, depending upon the nature of the particular emulsion to be treated. The concentration employed is also governed by the type of equipment utilized and the particular temperature employed. In treating emulsions which are particularly difficult to break, such as those known as "tank bottoms" and "residual pit oils," the ratio of 1 part or more of the treating agent to 500 parts of the emulsion above referred to may be required. In treating emulsions that yield readily to the reaction of chemical demulsifying agents, the ratio of 1 part of the treating agent to 30,000 parts of the emulsion may be sufficient to produce the desired result. Generally, the average petroleum emulsion may be broken by treatment with 1 part of the demulsifying agent for each 1,000 parts of the emulsion.

The following example is illustrative of the manner in which the novel process of this invention may be carried out.

Approximately 500 lbs. of a petroleum water-in-oil type emulsion containing about equal proportions of oil and brine are charged to a suitable metal container equipped with an efficient agitator. Approximately 0.1 lb. of an alkali metal trichloroacetate, such as sodium trichloroacetate, is then added to the petroleum emulsion, and the mixture vigorously stirred until a complete dispersion of the sodium trichloroacetate throughout the emulsion is obtained. Agitation is then stopped and the petroleum emulsion allowed to stand in a quiescent state, whereupon it separates into a clearly defined aqueous layer and an oil layer which may then be separated from each other by decantation.

What is claimed is:

1. A process for breaking petroleum emulsions of the water-in-oil type, which comprises adding to and vigorously mixing with said emulsion an emulsion breaker consisting essentially of a compound selected from the group consisting of trichloroacetic acid and its alkali metal and alkaline earth metal salts in an amount sufficient to break the emulsion.

2. A process for breaking petroleum emulsions of the water-in-oil type, which comprises adding to and vigorously mixing with said emulsion an emulsion breaker consisting essentially of an alkali metal trichloroacetate in an amount sufficient to break the emulsion.

3. The process as described in claim 1 wherein the alkali metal trichloroacetate is sodium trichloroacetate.

4. The process as described in claim 1 wherein the alkali metal trichloroacetate is potassium trichloroacetate.

ROBERT W. TOWNE.

REFERENCES CITED

The following references are of record in the file of this patent:

UNITED STATES PATENTS

| Number | Name | Date |
| --- | --- | --- |
| 1,689,728 | Johnson | Oct. 30, 1928 |
| 2,074,183 | Hershman | Mar. 16, 1937 |

FOREIGN PATENTS

| Number | Country | Date |
| --- | --- | --- |
| 225,617 | Great Britain | Dec. 4, 1924 |